United States Patent
Benoit et al.

(10) Patent No.: US 10,039,421 B2
(45) Date of Patent: Aug. 7, 2018

(54) DISASSEMBLABLE MULTI-GRATER SET

(71) Applicant: SEB S.A., Ecully (FR)

(72) Inventors: David Benoit, Gruffy (FR); Philippe De La Coussaye, Annecy le Vieux (FR); Stephane Plichon, Allonzier-la-Caille (FR); Robin Hoenderdos, Rotterdam (NL); Marcel Verkaik, Delft (NL); Abke Geels, Den Hoorn (NL); Mark Assies, Utrecht (NL)

(73) Assignee: SEB S.A., Ecully (FR)

( * ) Notice: Subject to any disclaimer, the term of this patent is extended or adjusted under 35 U.S.C. 154(b) by 153 days.

(21) Appl. No.: 14/960,746

(22) Filed: Dec. 7, 2015

(65) Prior Publication Data
US 2016/0157679 A1   Jun. 9, 2016

(30) Foreign Application Priority Data

Dec. 8, 2014   (FR) ...................................... 14 62080

(51) Int. Cl.
*A47J 43/25*   (2006.01)
(52) U.S. Cl.
CPC ..................... *A47J 43/25* (2013.01)
(58) Field of Classification Search
CPC ....................................................... A47J 43/25
USPC ................................................. 241/95, 273.1
See application file for complete search history.

(56) References Cited

U.S. PATENT DOCUMENTS

| | | | | |
|---|---|---|---|---|
| 2,482,180 A | * | 9/1949 | Heard | A47J 43/25 15/142 |
| 3,583,455 A | * | 6/1971 | Ostrowsky | A47J 43/25 241/100 |
| 5,312,054 A | * | 5/1994 | Feer | A47J 43/25 241/273.2 |
| 5,785,046 A | * | 7/1998 | Colla | F24B 1/202 126/151 |
| 6,244,529 B1 | * | 6/2001 | Tardif | A47J 43/255 241/100 |
| 7,461,803 B2 | * | 12/2008 | Boerner | A47J 43/25 241/168 |
| D593,817 S | | 6/2009 | Eide et al. | |
| 2005/0006505 A1 | * | 1/2005 | McNeeley | A47J 43/25 241/95 |
| 2010/0252669 A1 | * | 10/2010 | Romano | A47J 43/255 241/273.2 |
| 2011/0079670 A1 | * | 4/2011 | Ameli | A47J 43/25 241/95 |
| 2011/0290926 A1 | | 12/2011 | Talip | |
| 2014/0246527 A1 | | 9/2014 | Lee et al. | |

FOREIGN PATENT DOCUMENTS

WO    2008095316 A1   8/2008

* cited by examiner

*Primary Examiner* — Faye Francis
(74) *Attorney, Agent, or Firm* — The Webb Law Firm

(57) ABSTRACT

Multi-grater set (1) including at least a first and a second grater (2, 3), arranged opposite one another, and a handle part (8). The first and second graters (2, 3) are arranged in such a way that they can be disassembled, to be in an assembled working position or a separated position, particularly for cleaning, and in that the handle part (8) is arranged so as to be removable from the first (2) or the second grater (3) in order to cover the first (2) or the second grater (3) in the assembled position.

11 Claims, 2 Drawing Sheets

DISASSEMBLABLE MULTI-GRATER SET

CROSS-REFERENCE TO RELATED APPLICATION

This application claims priority to French Patent Application No. 1462080 filed Dec. 8, 2014, the disclosure of which is hereby incorporated in its entirety by reference.

Field of the Invention

This invention pertains to a grater-type cooking tool intended for use in preparing food, particularly for grating or slicing.

Description of Related Art

There exists, particularly in U.S. Pat. No. D593,817, grater-type cooking tools that form a multi-grater set comprising a first and a second grater arranged opposite one another, and a handle part. The multi-grater set forms a vertical container for catching the food being prepared. The vertical container comprises an upper opening and a handle arranged above the upper opening.

However, access to the inside of the container formed by such a multi-grater set, particularly for cleaning, is not easy.

In addition, the handle is small in size, and in an effort to get a better grip, the user may grab hold of the entire multi-grater set, and particularly the grater not being used, which is exposed and could injure the user's hand.

The purpose of this invention is to remedy the aforementioned disadvantages and to provide a multi-grater set with optimized ergonomics to allow the user to grate or slice food easily and in complete safety.

Another purpose of the invention is to provide a multi-grater set that is simple in design and inexpensive to implement.

Another purpose of the invention is to provide a multi-grater set that can be cleaned and stored easily.

SUMMARY OF THE INVENTION

These purposes are attained with a multi-grater set comprising at least a first and a second grater arranged opposite one another, and a handle part, characterized in that the first and second graters are arranged in such a way that they can be disassembled, so as to be in an assembled working position or a separated position, particularly for cleaning, and in that the handle part is arranged in a removable manner with respect to the first or the second grater, to cover the first or the second grater in the assembled position.

This kind of multi-grater set comprising at least a first and a second disassemblable grater, makes it easy to clean the two grating surfaces after use.

In addition, the handle part covers the unused grater and prevents it from being exposed to the user's hand. The handle part that covers the unused grater has a significant grip surface to ensure a secure hold, thereby obtaining a multi-grater set that can be used in complete safety.

In the statement, "the handle part covers the unused grater and prevents it from being exposed to the user's hand," it is understood that the handle part covers the entire unused grater when in the assembled working position.

The term "disassemblable" or "removable" means that the first and second graters, as well as the handle part, can be separated by the user easily, without requiring the use of a tool.

Preferably, the first and second graters comprise a male-female means of assembly.

This arrangement allows for simple assembly, particularly in a single direction of assembly.

Advantageously, the male assembly means is formed by at least one protuberance and the female assembly means is formed by at least one receptacle.

This arrangement provides a particularly simple, inexpensive means of assembling the graters.

Advantageously, the handle part comprises a means of fastening the first and second graters in the assembled position.

Thus, the assembly of the handle part on the first and second graters in the assembled position makes it possible to form the multi-grater set in a simple manner, without additional parts.

Preferably, the handle part has a truncated cone shape that extends along a longitudinal axis with a C-shaped transverse cross-section comprising two free ends, the fastening means being formed by said free ends.

This arrangement makes it possible to obtain a handle part, the shape of which ensures a good grip, while providing the function of fastening the first and second graters in the assembled position.

Advantageously, the first and second graters extend along the longitudinal axis and have two side walls arranged on either side of said longitudinal axis, and the free ends cooperate with the side walls of the first or the second grater in the assembled position.

The handle part is arranged easily on the graters, while covering the first or the second grater, along a direction of assembly parallel to the longitudinal axis.

Preferably, the handle part and the first and second graters comprise a means of locking the handle part onto the first or the second grater in the assembled position.

The handle part is assembled onto the first and second graters to hold them in the assembled position, and the handle part, particularly when the assembly procedure is complete, locks onto the first or the second grater. This arrangement thereby makes it possible to obtain a multi-grater set that can be used vigorously without risk of disassembly.

Advantageously, the means of locking the handle part is formed by a receptacle, and the locking means of the first and second graters are formed by a moving lock equipped with an operating button.

This arrangement obtains a means of locking the handle part onto the first or the second grater, that is particularly simple and inexpensive to produce.

Preferably, the first and second graters form a container equipped with an opening in the assembled position.

This arrangement creates a container for catching the food being prepared.

Advantageously, the handle part forms a pouring spout arranged near the opening.

This arrangement is a simple, inexpensive way to obtain a pouring spout that makes it easy to dispense the food being prepared.

Preferably, the multi-grater set comprises a non-slip foot.

This arrangement makes it possible to use the multi-grater set on any type of surface, particularly a smooth or damp surface, on which it could slide during use.

Advantageously, the first and second graters comprise a metal plate equipped with openings forming sharpened protrusions, and a surrounding casing made of plastic, said surrounding casing being obtained through an overmolding process on said metal plate.

A plastic casing arranged around the metal plates makes it possible to obtain graters without sharp edges. Moreover, it is easy to arrange assembly means in a plastic casing, particularly during the injection molding process.

Preferably, the non-slip foot is made by a partial overmolding process onto the surrounding casing.

BRIEF DESCRIPTION OF THE DRAWINGS

The invention will be better understood upon examining the method of implementation illustrated in the attached drawings, which should not be taken as limiting in any way, and in which.

DETAILED DESCRIPTION OF THE INVENTION

Figure 1:
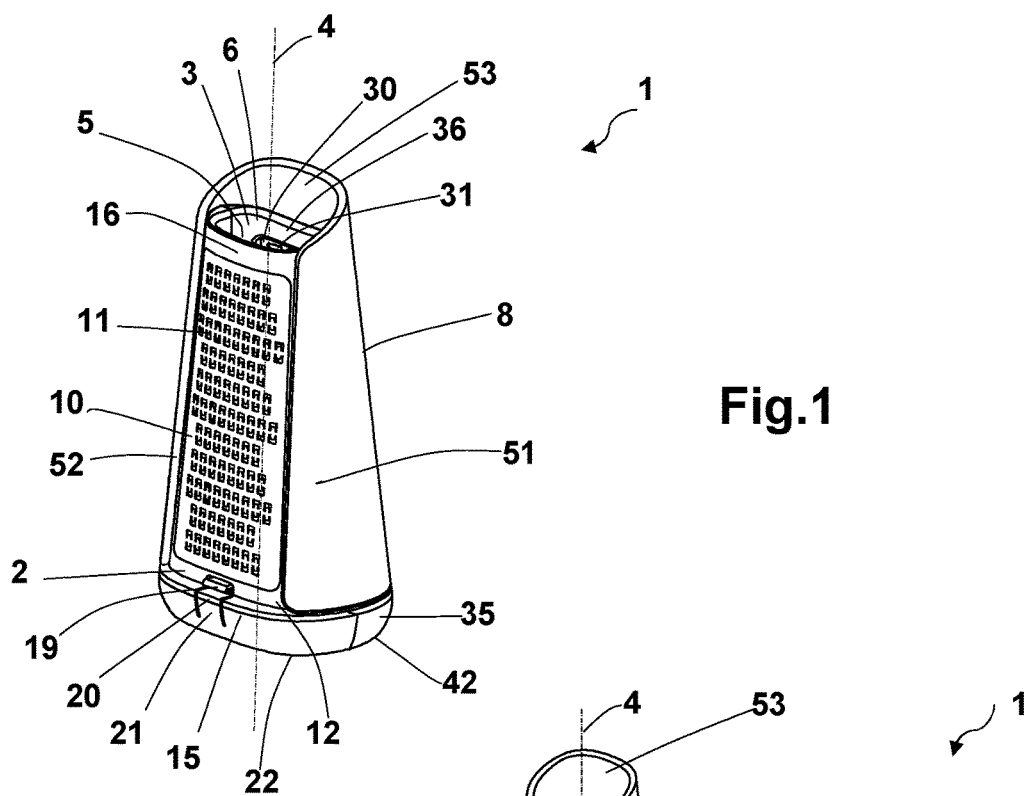
FIG. 1 presents a perspective view of a multi-grater set in one particular method of implementing the invention.
Figure 2:
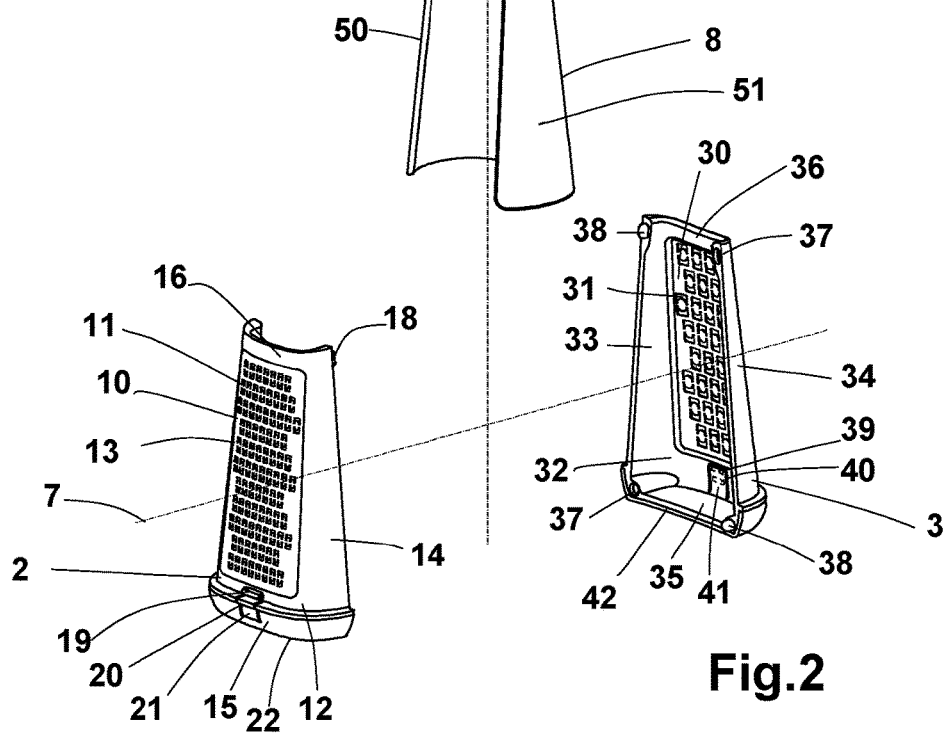
FIG. 2 presents an exploded perspective view of the multi-grater set depicted in FIG. 1, the two graters and the handle part being in position for assembly.
Figure 3:
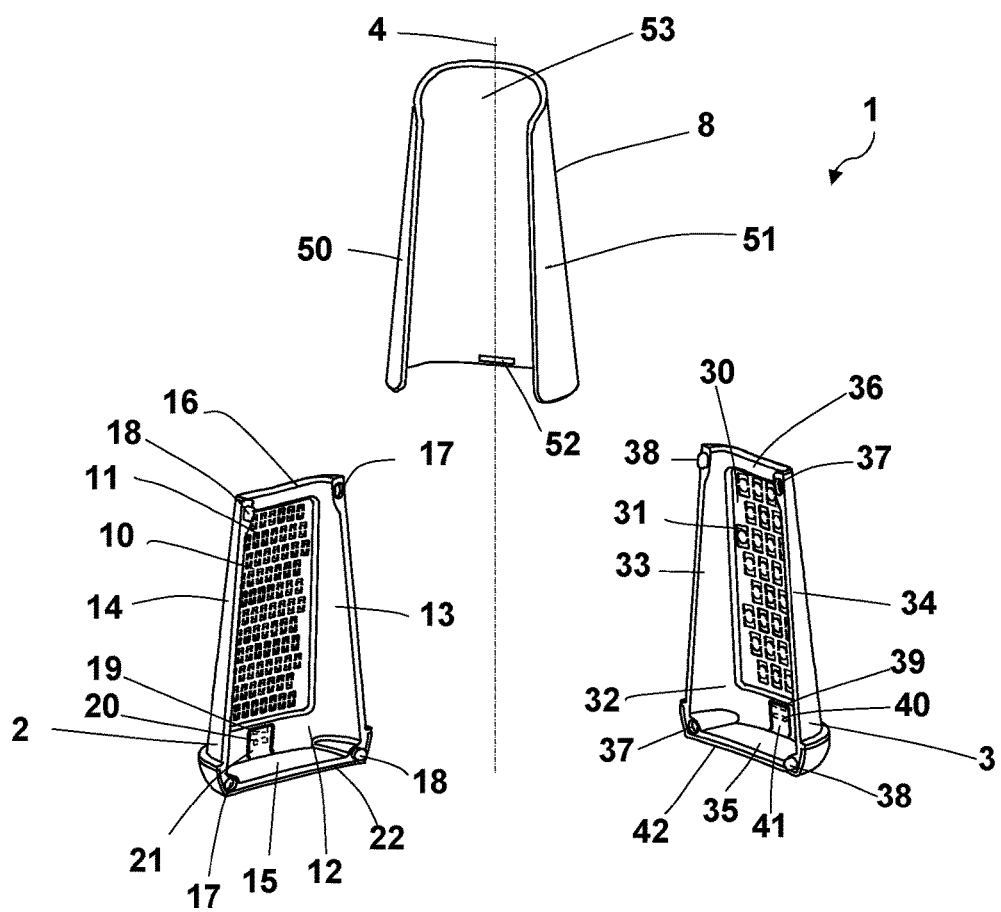
FIG. 3 presents an exploded perspective view of the multi-grater set depicted in FIG. 1.

In the method of implementation that can be seen in FIGS. 1 through 3, the multi-grater set (1) comprises a first and second grater (2, 3) and a handle part (8). The first and second graters (2, 3) each comprise a metal plate (10, 30), equipped with openings (11, 31) forming sharpened protrusions. The openings (11) of the first grater (2) are of a smaller size than the openings (31) of the second grater (3), to allow a user to prepare grated or sliced food in two different sizes. The first and second graters (2, 3) extend along a longitudinal axis (4) and comprise a surrounding casing (12, 32) made of plastic. The surrounding casing (12, 32) is obtained through an overmolding process on the metal plate (10, 30).

As can be seen in FIGS. 2 and 3, the surrounding casing (12) comprises, on either side of the longitudinal axis (4), two curved side walls (13, 14), at a first longitudinal end, a curved lower wall (15), and at a second longitudinal end, an upper wall (16). The surrounding casing (32) comprises, on either side of the longitudinal axis (4), two curved side walls (33, 34), at a first end, a curved lower wall (35), and at a second end, an upper wall (36).

The first and second graters (2, 3) are designed to be arranged opposite one another in the assembled position to form a container (5) (FIG. 1) with a bottom formed by the lower walls (15, 35) and an opening (6) formed by the upper walls (16, 36). The container (5) extends along the longitudinal axis (4) and has a truncated cone shape, the transverse cross-section of which is oblong. The surrounding casings (12, 32) have protuberances (18, 38) and receptacles (17, 37) (FIGS. 2 and 3), respectively, which cooperate to position the first and second graters (2, 3) in the assembled position. The first and second graters (2, 3) are assembled in a direction (7) perpendicular to the longitudinal axis (4) (FIG. 2).

As can be seen in FIG. 2, the handle part (8) has a general truncated cone shape extending along the longitudinal axis (4) with a C-shaped transverse cross-section comprising two free ends (50, 51). The handle part (8) is inserted onto the first and second graters (2, 3) along a stroke that runs parallel to the longitudinal axis (4) so that the free ends (50, 51) that cooperate with the side walls (13, 14 or 33, 34) of the first (2) or the second grater (3) hold the first and second graters (2, 3) in the assembled position when the handle part (8) reaches the end of the insertion stroke.

The first and second graters (2, 3) comprise a lock (19, 39) that moves between a forward position and a back position. The lock (19, 39) is arranged at one end of a flexible strip (21, 41) that forms a means of returning from the back position to the forward position. The handle part (8) has a receptacle (52) for the lock (19 or 39). In the final part of its insertion stroke, the handle part (8) presses on an inclined surface of the lock (19 or 39) to slide the lock (19 or 39) from the forward position to the back position, and then at the end of the insertion stroke of the handle part (8), the lock (19 or 39) resumes its forward position to be inserted inside the receptacle (52), thereby locking the handle part (8) onto the graters (2, 3). A button (20, 40) is arranged on each flexible strip (21, 41). When the user presses the button (20, 40), the lock (19, 39) can be slid from the forward position to the back position, and thus the handle part (8) is released and can be moved.

The lock (19, 39), the button (20, 40) and the flexible strip (21, 41) are arranged in the lower wall (15, 35) and are made in the same plastic as the surrounding casing (12, 32). An elastomer skin is molded onto the lower wall (15, 35) to form a non-slip foot (22, 42).

The handle part (8) comprises a bump that extends along the longitudinal axis (4) to form a pouring spout (53) arranged near the opening (6) when the handle part is locked onto the graters (2, 3).

Of course, the invention is in no way limited to the method of implementation described and illustrated, which has been provided only as an example. Modifications remain possible, particularly regarding the constitution of the various components or by substituting equivalent techniques, while still remaining within the scope of protection of the invention.

Thus, in one variation of implementation, the multi-grater set comprises three disassemblable graters arranged in a triangle, and the handle part covers two of the three graters.

The invention claimed is:

1. Multi-grater set (1) comprising at least a first and second grater (2, 3) arranged opposite one another, and a handle part (8), wherein the first and second graters (2, 3) are arranged in such a way that they can be disassembled and assembled, and wherein the handle part (8) is removable and arranged with respect to the first (2) or the second grater (3) to cover the first (2) or the second grater (3) such that the first (2) or the second grater (3) that is not being used is not exposed to the user's hand, wherein the first grater and the second grater each independently comprise a male means of assembly formed by at least one protuberance that engages a female means of assembly formed by at least one receptacle and which are arranged opposite one another to create a container with an opening formed by upper walls of the first and second graters, and wherein the first and second graters each independently comprise a curved lower wall that form a bottom of the container.

2. Multi-grater set (1) described in claim 1, wherein the male means of assembly is formed by at least one protuberance (18, 38) and in that the female means of assembly is formed by at least one receptacle (17, 37).

3. Multi-grater set (1) described in claim 1, wherein the handle part (8) comprises a means (50, 51) of fastening the first and second graters (2, 3) in the assembled position.

4. Multi-grater set (1) described in claim 3, wherein the handle part (8) has a truncated cone shape extending along a longitudinal axis (4) with a C-shaped transverse cross-section comprising two free ends (50, 51), the fastening means being formed by said free ends (50, 51).

5. Multi-grater set (1) described in claim 4, wherein the first and second graters (2, 3) extend along the longitudinal axis (4) and comprise two side walls (13, 14, 33, 34) arranged on either side of said longitudinal axis (4), and wherein the free ends (50, 51) cooperate with the side walls (13, 14, 33, 34) of the first (2) or the second grater (3) in the assembled position.

6. Multi-grater set (1) described in claim 3, wherein the handle part (8) and the first and second graters (2, 3) comprise a means (52, 19, 39) of locking the handle part (8) onto the first or onto the second grater (2, 3) in the assembled position.

7. Multi-grater set (1) described in claim 6, wherein the means of locking the handle part (8) is formed by a receptacle (52), and in that the means of locking the first and second graters (2, 3) is formed by a movable lock (19, 39) equipped with an operating button (20, 40).

8. Multi-grater set (1) described in claim 1, wherein the handle part (8) forms a pouring spout (53) arranged near the opening (6).

9. Multi-grater set (1) described in claim 1, including a non-slip foot (22, 42).

10. Multi-grater set (1) described in claim 1, wherein the first and second graters (2, 3) comprise a metal plate (10, 30) equipped with openings (11, 31) forming sharpened protrusions, and a surrounding casing (12, 32) made of plastic, said surrounding casing (12, 32) being obtained by an overmolding process onto said metal plate (10, 30).

11. Multi-grater set (1) described in claim 10, wherein the non-slip foot (22, 42) is made by a partial overmolding process onto the surrounding casing (12, 32).

\* \* \* \* \*